United States Patent Office 3,215,741
Patented Nov. 2, 1965

3,215,741
PROCESS FOR PREPARING AMINE OXIDES
Albert F. Chadwick, Wilmington, Del., assignor to E. I. du Pont de Nemours and Company, Wilmington, Del., a corporation of Delaware
No Drawing. Filed Jan. 8, 1963, Ser. No. 250,018
6 Claims. (Cl. 260—583)

This invention relates to the preparation of amine oxides, particularly oxides of tertiary aliphatic amines having one higher alkyl group and two lower alkyl groups attached to an amine nitrogen atom.

Amine oxides of tertiary aliphatic amines in which all of the alkyl radicals on the nitrogen atom are lower alkyl radicals have been prepared by reacting the amine with dilute hydrogen peroxide, usually in large excess. Although a similar method has been proposed to prepare oxides of tertiary amines having at least one higher alkyl group attached to the amine nitrogen atom, it was generally considered necessary to carry out the reaction employing a solution of the amine in an organic solvent such as ethanol. Even with the use of ethanol as solvent and elevated reaction temperatures rather long reaction periods were considered necessary.

The amine oxides of tertiary amines of the formula

in which each of $R_1$ and $R_2$ is methyl or ethyl and $R_3$ is an alkyl radical having from 10 to 20 carbon atoms are useful for many purposes and particularly as detergents and surface active agents. For some important uses, relatively concentrated solutions of such amine oxides are most conveniently employed. In view thereof, there is a need for an effective and practical way of reacting the amine and hydrogen peroxide so as to obtain directly such concentrated solutions of the amine oxide.

Avoidance of the use of reaction diluents and the employment of concentrated aqueous hydrogen peroxide might be expected to yield the desired concentrated amine oxide solutions. However when commercially available grades of relatively concentrated aqueous hydrogen peroxide (containing from about 20 to 90% $H_2O_2$ by weight) are used for this purpose, it has been found that the reaction mixture sets up as a gel resembling a thick starch paste long before completion of the reaction. Formation of such a gel makes effective agitation and uniform control of the reaction temperature impossible. On the other hand, if the hydrogen peroxide employed is sufficiently dilute to preclude the formation of such a gel, the rate of reaction is significantly reduced and complete conversion of the amine to the desired oxide is difficult to achieve. Essentially complete conversion is highly desirable for a very practical reason since the presence of more than about 5% of the amine in unconverted form in the product solution greatly reduces the detergent properties of the amine oxide.

It is an object of the invention to provide a method for reacting tertiary amines of the kind represented by the above formula and hydrogen peroxide so as to produce directly product amine oxide solutions of relatively high concentration. Another object is to provide such a method wherein the amine reactant is converted to the amine oxide at a practical rate to yield directly a relatively concentrated amine oxide product solution which is substantially free of unconverted amine. Still further objects will be apparent from the following description.

The objects of the invention are accomplished by reacting under agitation a tertiary aliphatic amine of the above formula with at least a stoichiometrically equivalent amount of an aqueous hydrogen peroxide solution containing at least 20% $H_2O_2$ by weight at a temperature within the range 40 to 80° C. until substantially complete conversion of the amine to its oxide has occurred, and during the course of the reaction diluting the reaction mixture with water as required to permit effective agitation of the reaction mixture. The amount of dilution water used should be less than an amount which would result in a reacted product solution having an amine oxide content of less than 20% by weight.

A preferred way of practicing the invention involves agitating a body of a tertiary aliphatic amine of the above formula at a temperature in the range 40 to 80° C. while gradually adding thereto at least a stoichiometrically equivalent amount of an aqueous hydrogen peroxide solution containing at least 20% $H_2O_2$ by weight, maintaining the resulting mixture at a temperature in the above range until substantially complete conversion of the amine to its oxide has occurred, and during the course of the reaction diluting the reaction mixture with water as required to permit effective agitation of the reaction mixure.

All of the tertiary aliphatic amines of the formula set forth above may be converted to amine oxides in accordance with the invention. Mixtures of such amines can be used to produce useful mixtures of their oxides. Use of dimethyldodecylamine is generally preferred because of its availability and excellent detergent properties of its oxide. Other suitable amine reactants are dimethyldecylamine, diethyldodecylamine, dimethyltridecylamine, dimethyltetradecylamine, dimethylhexadecylamine and dimethyloctadecylamine.

The aqueous hydrogen peroxide reactant should be a water solution of hydrogen peroxide containing at least 20% $H_2O_2$ by weight, since use of more dilute solution will result in a sluggish reaction particularly during the early stages. Any of the commercially available grades of aqueous hydrogen peroxide containing at least 20% $H_2O_2$ by weight are suitable for use. The use of solutions containing 30 to 75% $H_2O_2$, such as the commercial 35%, 50% and 70% grades, is preferred. More concentrated solutions, e.g., 90% material, can also be used, particularly if they are diluted somewhat before use.

The reaction is preferably carried out by adding the aqueous peroxide reactant gradually to a body of the amine reactant maintained at a temperature of 40 to 80° C., preferably 55 to 75° C. The reaction rate is too low to be practical at temperatures below 40° C. while temperatures above 80° C. are generally undesirable since they result in yellow colored reaction mixtures. Most preferably, the amine is maintained at a temperature of from about 55 to 65° C. during the addition of the peroxide thereto and the reaction is then completed at a temperature from 65 to 80° C.

The amount of dilution water to be added during the course of the reaction will depend to some extent upon the temperature conditions employed, the specific amine or mixture of amines being reacted and the amount of water present in the aqueous hydrogen peroxide employed as a reactant. Obviously, amounts of dilution water substantially in excess of the minimum amount necessary to avoid gelling of the reaction mixture to such an extent that effective agitation is impossible will generally not be employed, since such excessive amounts unnecessarily dilute the product solution and lower the reaction rate. When avoiding such excess of dilution water, product solutions containing 30 to 40% by weight of dimethyldodecylamine oxide are readily obtained. When product solutions of maximum concentration are not required, some excess of dilution water can be tolerated, however, no significant advantage results from the use of such large amounts as will result in product solutions containing less than about 20% amine oxide. Preferably, addition of the dilution water will be withheld until about the time gelling becomes imminent or just starts, then the water is added incrementally or gradually during the remainder of the reaction period as required to permit effective agitation. Addition of the dilution water in this way also facilitates controlling the reaction temperature.

Substitution of a water soluble alcohol such as methanol, ethanol or isopropanol for the dilution water employed in the latter part of the reaction period makes it possible to obtain product solutions having an amine oxide content somewhat greater than the maximum content possible when using the above mentioned minimum amount of water. Thus, product solutions containing up to about 50% dimethyldodecylamine oxide have been obtained when methanol has been substituted for water in the above manner, the amount of methanol used being such that the product solution contained 10% of methanol. Substitution of an alcohol for all of the dilution water, or the use of an alcohol as reaction solvent during the entire course of the reaction is disadvantageous since substantially lower conversions of the amine to the oxide results thereby. However, an alcohol can be employed as diluent during the latter stages of the reaction without significant reduction in conversion and with the advantage of permitting the obtainment of a more concentrated product solution.

The invention is illustrated by the following examples in which all percentage concentrations are by weight.

Example 1

A sample of commercial dimethyldodecylamine was fractionally distilled and the fraction boiling at 82–85° C. at 2 mm. Hg pressure and having a neutralization equivalent of 223 was collected for use. A 67 g. portion (0.3 mole) thereof was heated to 58° C. under agitation and 32 g. of aqueous 35% hydrogen peroxide (0.33 mole) was added slowly thereto over a period of 34 minutes. The temperature was held at 59 to 62.5° C. during the addition. Gelling of the mixture started when about half of the peroxide had been added. The gel that had formed was dissolved and further gelling was prevented by the addition portionwise of 75 g. of water during the addition of the remaining peroxide. An additional 55 g. of water was added and the mixture was heated to 75° C. in 0.5 hour, then maintained at that temperature for 2 hours. The reaction mixture was agitated continuously throughout the reaction period. The final mixture, i.e. the product solution, was found by analyses to contain 30.7% dimethyldodecylamine oxide and only 0.33% unreacted amine. The conversion of the original amine to the oxide was 98.8%.

Example 2

The general procedure of Example 1 was followed using a sample of a commercial dimethyldodecylamine which was not freshly distilled before use and had a neutralization equivalent of 239. There were employed 95.6 g. (0.40 mole) of the amine, 41.9 g. of 35.7% hydrogen peroxide (0.44 mole) and a total of 118 g. of dilution water. The addition of the peroxide to the amine was made over a period of 42 minutes with agitation, while the amine was held at 55 to 63.5° C. When about half the peroxide had been added, the reaction mixture started to gel; it was kept fluid by the addition of 25 ml. of the dilution water. When all the peroxide had been added, a further addition of 64 ml. of water was required to maintain fluidity. The temperature of the reaction mixture was then raised to 75° C. over a 58 minute period, at the end of which time a further addition of 29 g. of water was necessary to maintain fluidity. Four hours after beginning the addition of the peroxide, the fluid reaction mixture was found by analysis to contain 40.0% amine oxide and 1.3% amine. The amine oxide content represented a conversion of 96.7% of the amine to amine oxide.

Example 3

A sample of dimethyltetradecylamine was fractionally distilled and a fraction boiling at 83 to 85° C. at 1 mm. Hg pressure and having a neutralization equivalent of 266 was collected. The general procedure of Example 1 was repeated employing 67 g. (0.2 mole) of the distillate fraction, 21.4 g. 35% hydrogen peroxide (0.22 mole) and 114 g. of dilution water. The temperature of the amine was held at 58 to 63° C. during the 31 minutes while the peroxide was being added. The temperature of the mixture was raised in 0.5 hour to 75° C. then held at 75° C. for 2 hours. Gelling started when about two-thirds of the peroxide had been added. The gel that formed was dissolved and further gelling was prevented by addition of the dilution water incrementally as required. The product solution analyzed 30.3% dimethyltetradecylamine oxide and 0.13% unreacted amine. The conversion of the amines to its oxide was 99.5%.

Example 4

A freshly distilled sample of dimethyloctadecylamine analyzing 95.4% amine was reacted following the general procedure of Example 1. A 124 g. portion (0.4 mole) thereof, 44 g. of 34% hydrogen peroxide (0.44 mole) and 344 g. of dilution water were used. The temperature of the amine during the 46 minutes while the peroxide was added was 59.5 to 62° C. Thereafter, the temperature of the mixture was raised to 75° C. in 1 hour, then held at 75° C. for 8 hours. The dilution water was added as required to permit effective agitation. The viscous product solution analyzed 25.5% dimethyloctadecylamine oxide and 0.12% unreacted amine. The conversion of the amine to its oxide was 99.5%.

The above examples show that with freshly distilled amine use of about a 10% excess of the hydrogen peroxide reactant results in a conversion of 98% or more of the amine to its oxide. Larger excesses of the peroxide can of course be used but would be wasteful and result in no significant improvement in conversion of the amine to its oxide since substantially complete conversion results when only a 10% excess is used. Excellent but slightly lower conversions result when using theoretical amounts of peroxide. In order that the product solution be not contaminated with a substantial amount of unreacted amine, the presence of which lowers substantially the detergent effectiveness of the amine oxide, the use of less than theoretical amounts of peroxide is not recommended.

The examples show the preferred addition of the peroxide to the amine which has been preheated to a temperature at which the reaction proceeds at a practical rate. Alternatively, the amine and the peroxide can be mixed at a lower temperature, following which the mixture is brought to reaction temperature and there maintained until completion of the reaction.

The method of the invention can be practiced either batchwise, as shown in the examples, or continuously. If continuous operation is desired, the peroxide can be fed continuously to an agitated body of the amine maintained in a mixing zone at the desired temperature, to which zone the amine is also fed continuously. The resulting mixture is then passed or pumped continuously through a tubular reactor designed to effect turbulent flow of the material therethrough in a time corresponding to the desired reaction time. The tubular reactor would be maintained at the desired temperature and be provided with inlets for injecting at points along its length the amounts of dilution water required.

The method of the invention provides a highly effective and practical way of reacting tertiary aliphatic amines of the kind indicated with hydrogen peroxide to obtain directly concentrated product solutions which are substantially free of unreacted amine.

I claim:
1. The method of producing a water solution of an amine oxide, said method comprising reacting under agitation (1) a teritary aliphatic amine of the formula

wherein each of $R_1$ and $R_2$ is from the group consisting of methyl and ethyl radicals and $R_3$ is an alkyl radical having from 10 to 20 carbon atoms, and (2) an aqueous hydrogen peroxide solution containing at least 20% $H_2O_2$ by weight at a temperature within the range 40 to 80° C. until substantially complete conversion of said amine to its oxide has been effected, and during the course of said reaction diluting the reaction mixture with water as required to permit effective agitation of said reaction mixture; said reaction mixture consisting essentially of said amine, said amine oxide, hydrogen peroxide and water, and the amount of water employed to dilute said reaction mixture being such that the amine oxide content of the resulting product solution is at least 20% by weight.

2. The method of claim 1 wherein the reaction is effected at a temperature within the range 55 to 80° C.

3. The method of claim 1 wherein the amine is dimethyldodecylamine.

4. The method of claim 1 employing an aqueous hydrogen peroxide solution containing 30 to 75% $H_2O_2$ by weight.

5. The method of producing directly a water solution of an amine oxide having an amine oxide content of at least 20% by weight by reacting hydrogen peroxide and an amine of the formula

wherein each of $R_1$ and $R_2$ is from the group consisting of methyl and ethyl radicals and $R_3$ is an alkyl radical having from 10 to 20 carbon atoms, said method comprising agitating a body of said amine at a temperature in the range 40 to 80° C. while gradually adding thereto at least a stoichiometric amount of an aqueous hydrogen peroxide solution containing at least 20% $H_2O_2$ by weight, maintaining the resulting mixture at a temperature within said range until said amine is substantially completely converted to its amine oxide, and during the course of the reaction diluting the reaction mixture with added water as required to permit effective agitation of said reaction mixture; said reaction mixture consisting essentially of said amine, said amine oxide, hydrogen peroxide and water, and the amount of said added water being such that the amine oxide content of the resulting product solution is at least 20% by weight.

6. The method of claim 5 employing dimethyldodecylamine.

References Cited by the Examiner
UNITED STATES PATENTS

| | | | |
|---|---|---|---|
| 2,169,976 | 8/39 | Guenther et al. | 260—563 X |
| 2,220,835 | 11/40 | Bruson et al. | 260—563 X |
| 3,047,579 | 7/62 | Witman | 260—563 X |

CHARLES B. PARKER, *Primary Examiner.*